Patented Aug. 12, 1924.

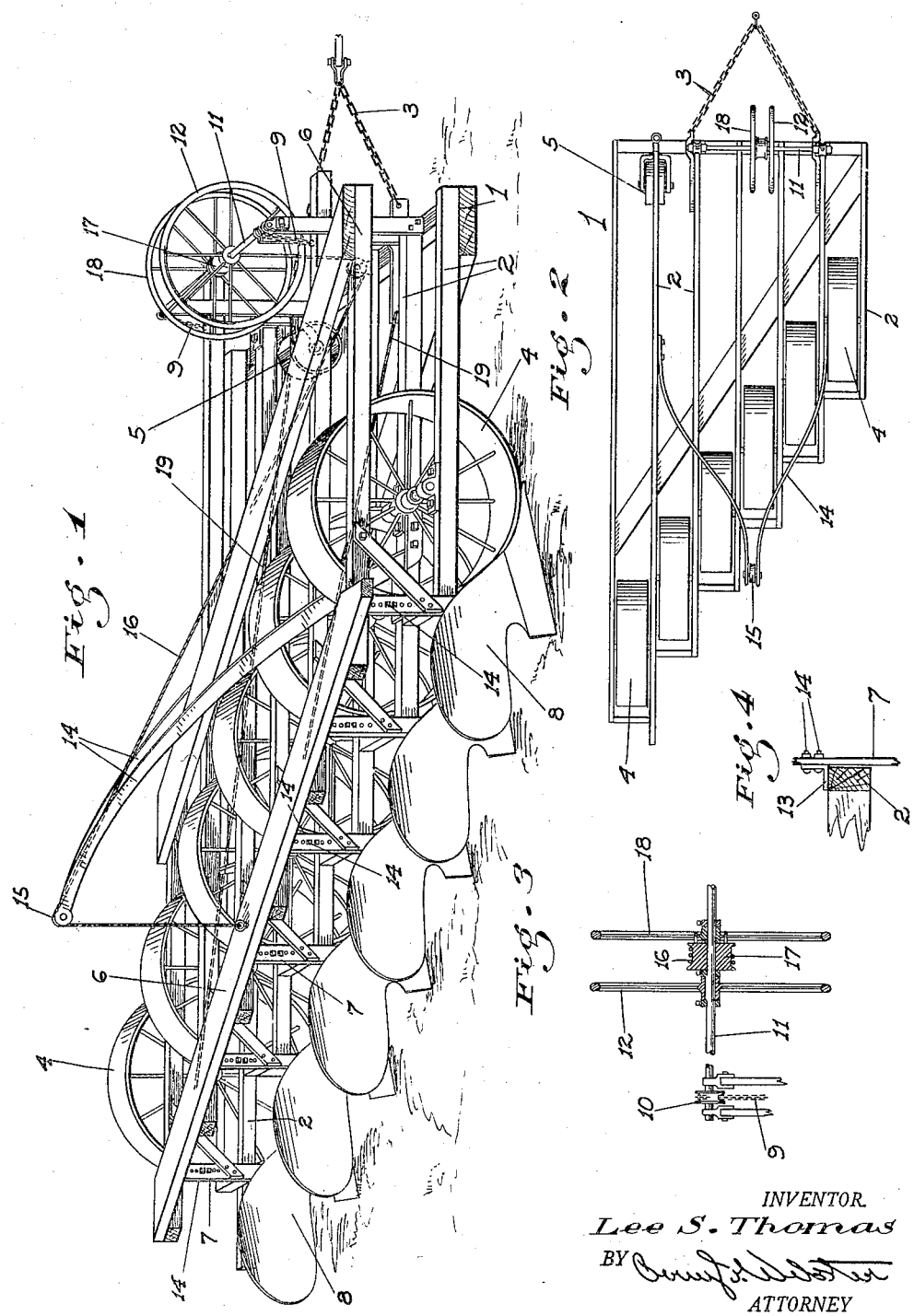

1,504,585

UNITED STATES PATENT OFFICE.

LEE S. THOMAS, OF STOCKTON, CALIFORNIA.

PLOW FOR DEEP AND SOFT-LAND PLOWING.

Application filed October 29, 1921. Serial No. 511,472.

*To all whom it may concern:*

Be it known that I, LEE S. THOMAS, a citizen of the United States of America, residing at Stockton, county of San Joaquin, State of California, have invented certain new and useful Improvements in Plows for Deep and Soft-Land Plowing; and I do declare the following to be a full, clear, and exact description of the same, reference being had to the accompanying drawings, and to the characters of reference marked thereon, which form a part of this application.

This invention relates to improvements in gang plows, and particularly to a type using the standard type of plow share as distinguished from the disc type of plow; the principal object of the invention being to provide a plow of this character especially adapted for use in soft land such as the peat soil found in this state in certain localities, which, especially when rain soaked, can sustain but very little weight on its surface without giving.

Ordinary plowing devices, usually having one or two supporting wheels, are therefore useless for plowing in this soil, since the relatively small bearing surface offered by the few wheels is never sufficient to prevent the downward pressure of the plow share from pulling the whole device deep into the ground, wheels and all, from which position it is often extricated only with difficulty and at the cost of considerable time and labor.

With a gang plow built according to my invention however, the above cited difficulties are eliminated, and the plow as a unit will operate efficiently in any kind of soil, regardless of the number of plows used in a gang, which is only dependent on the power of the tractor or other pulling means.

Another object of my invention is to provide a very simple means for setting the plows to dig to any desired depth, without changing the position of the supporting wheels, which may thus be and are permanently mounted in simple and rigid bearings.

I have also constructed the plow so that the plowing depth will be maintained by the plows, regardless of any unevenness of the surface of the ground at various points.

A further object of the invention is to produce a simple and inexpensive device and yet one which will be exceedingly effective for the purposes which it is designed.

These objects I accomplish by means of such structure and relative arrangement of parts as will fully appear by a perusal of the following specification and claims.

In the drawings similar characters of reference indicate corresponding parts in the several views:

Fig. 1 is a perspective view of the complete plow.

Fig. 2 is a top plan view of the main supporting frame.

Fig. 3 is a fragmentary sectional view of the hand control-wheels.

Fig. 4 is a fragmentary end view of a main beam and a plow-supporting standard, showing an adjustable means for preventing downward movement of the strut relative to the beam.

Referring now more particularly to the characters of reference on the drawings, the numeral 1 denotes in general the lower or supporting frame of the plow, consisting essentially of a number of horizontal and longitudinal beams, spread transversely, and whose forward ends lie in a common transverse plane, while their rear ends are in successively offset planes from each other.

These beams are rigidly connected together in any suitable manner, and have at their front end a suitable draw bar member 3 for connection to a tractor or the like.

Between each pair of beams, adjacent the rear ends thereof and positioned in offset alinement as are these ends of the beams are ground bearing and rigidly mounted wheels 4, while at the front end of the frame on that side thereof having the longest of the beams 2 is a swivel wheel 5.

Superimposed over the frame 1 and a certain distance thereabove is the plow frame 6, very similar in its general construction to the frame 1, and set normally some distance thereabove.

Fixed to and depending downwardly from the rear end of the frame 6 alongside the ends of the beams 2 are rigid standards 7, on the lower ends of which are fixed plow shares 8 of ordinary character, each of which is in offset transverse alinement corresponding to the wheels 4 and being positioned immediately behind an adjacent wheel and to one side thereof, there being a wheel for each share.

The front end of the frame 6 is held in any desired position above the frame 1 by means of chains 9 or other flexible members which pass around drums 10 mounted on a transverse shaft 11 mounted on the forward end of the frame 1 and thereabove, a hand wheel 12 or similar member being provided whereby to turn the shaft.

The rear end of the frame 6 is held against undesired downward movement by means of removable and vertically adjustable stops 13, held in place on the standards 7 at any one of a number of points by bolts 14, the stops resting on the upper edge of the adjacent beams 2.

In order to hold the plow beam up at its rear end while the stops 13 are being placed in any desired position, or while transporting the device without plowing, I provide derrick-arms 14 fixed on the wheel frame 1, which terminate above the rear end of the frame 6, with a sheave 15 at such termination. A cable 16 passes over this sheave from a connection with the frame 6 to a drum 17 turnably mounted on the shaft 11, a hand wheel 18 being fixed to this drum.

Any suitable form of pawl-and-ratchet, or friction brake devices are connected to the hand wheels, to prevent undesired movement thereof.

Cables 19 are adjustably connected to the frame 1 at the front end, and extend to fixed connections with the frame 6 at the rear end thereof, adjacent which front-end points the drawbar member 3 is also connected.

In operation, to dig at any desired depth, the stops 13 are set accordingly on the standards.

The hand wheel 12 is then manipulated to lower the front end of the frame 6, a corresponding distance, which will tip the frame and cause the points of the shares 8 to slope downwardly.

On the frame 1 being then put in motion, the plows will sink into the ground until the stops 13 bear against the beams 2, limiting the downward movement of the plows. To raise the plows out of the ground, the wheel 12 is turned to raise the frame 6 at that end, which will cause the plows to gradually work themselves out of the ground with a continued forward movement of the device. The wheel 18 may then be turned to wind up the cable 16 and raise the plows still higher, so as to prevent dragging of the same along the ground.

By reason of the wheels 4, one for each plow, there is ample ground bearing surface for the main frame regardless of soil conditions, so that neither the plows nor the wheels will bury themselves at any time. Also if one wheel passes over a depression or soft spot, the others prevent it from sinking, thus maintaining an even depth of plowing.

By reason of the cables 19, the pull on the frame 6 is taken direct from the tractor or draw bar, these cables acting as a form of radius bar, either end of which may be the axis of turning of the plow frame.

Thus when the rear end of the frame 6 is raised or lowered, the front end connections of these cables becomes the axis of turning. When the front end of the frame 6 is moved, the opposite end of the cables 19 form the axis of turning, which allows for the tilting of the plows as described and necessary for proper functioning as to their automatically biting into and raising out of the ground.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:—

1. A gang plow comprising a wheel supported frame, an auxiliary frame superimposed thereon, adjustable means between the auxiliary and main frames at the rear end thereof for supporting and holding the auxiliary frame at varied heights relative to the main frame, plowing devices projecting downwardly from and fixed to the rear end of the auxiliary frame, and means for independently adjusting the height of the forward end of the auxiliary frame relative to the main frame.

2. A gang plow comprising a wheel supported frame, an auxiliary frame superimposed thereon, adjustable means between the auxiliary and main frames at the rear end thereof for supporting the auxiliary frame from the main frame at varied heights relative thereto and arranged to prevent further downward movement of the auxiliary frame while unrestricting its upward movement at that end, independent means for supporting the rear end of the auxiliary frame independent of the adjustable means, plowing devices projecting downwardly from and fixed to the rear end of the auxiliary frame, and means for independently adjusting the height of the forward end of the auxiliary frame relative to the main frame.

3. A gang plow comprising a wheel-supported frame, an auxiliary plow-carrying frame supported therefrom and thereabove, and tension members extending from the forward end of the main frame to the rear end of the auxiliary frame and connected to both frames.

4. A gang plow comprising a main frame, a plurality of transversely disposed and offset wheels mounted thereon at the rear end thereof, an auxiliary frame structure supported from the main frame and extending rearwardly of the wheels, and plowing devices supported by the auxiliary frame, said devices being to the rear of the wheels and in planes to one side thereof.

In testimony whereof I affix my signature.

LEE S. THOMAS.